(12) United States Patent
Sanders et al.

(10) Patent No.: US 6,347,100 B1
(45) Date of Patent: Feb. 12, 2002

(54) SHORT WAVELENGTH FIBER LASER

(75) Inventors: Steven Sanders, Belmont; Bernard G. Fidric, Cupertino, both of CA (US)

(73) Assignee: SDL, Inc., San Jose, CA (US)

(*) Notice: Subject to any disclaimer, the term of this patent is extended or adjusted under 35 U.S.C. 154(b) by 0 days.

(21) Appl. No.: 09/419,138

(22) Filed: Oct. 15, 1999

Related U.S. Application Data

(60) Provisional application No. 60/114,710, filed on Jan. 4, 1999.

(51) Int. Cl.[7] .................................................. H01S 3/30
(52) U.S. Cl. ................................. 372/6; 372/5; 372/32; 372/70
(58) Field of Search .............................. 372/5, 6, 32.7

(56) References Cited

U.S. PATENT DOCUMENTS

| | | | | |
|---|---|---|---|---|
| 5,657,153 A | * | 8/1997 | Endriz et al. | 359/341 |
| 5,666,373 A | * | 9/1997 | Sharp et al. | 372/18 |
| 5,991,314 A | * | 11/1999 | Ionov et al. | 372/6 |
| 6,081,369 A | * | 6/2000 | Waarts et al. | 359/341 |
| 6,215,809 B1 | * | 4/2001 | Ziari et al. | 372/96 |

* cited by examiner

Primary Examiner—James W. Davie
Assistant Examiner—Davienne Monbleau
(74) Attorney, Agent, or Firm—Kudirka & Jobse, LLP

(57) ABSTRACT

A fiber laser uses a mechanism to prevent a thermally induced shift of the gain spectrum to a range that causes the laser to become destabilized when operated at a first signal wavelength. By establishing a nominal gain spectrum that is further from the undesired range than in a conventional laser, a gain spectrum shift does not reach the undesired wavelength range. This may be accomplished by decreasing the reflectivity of a resonant cavity of the laser, such as by angling the reflective end of the cavity. It may also be accomplished by increasing the population inversion of the laser. Using a pump energy reflector to prevent pump energy from exiting the inner cladding of a double-clad version of the laser the fiber may increase population inversion. The fiber length may also be shortened or the diameter of the inner cladding reduced to increase the population inversion before a laser output is achieved. In another embodiment, a thermally induced shift of the gain spectrum into the undesired wavelength range is prevented by using a controlled temperature environment, such as a housing with a cooling mechanism.

58 Claims, 4 Drawing Sheets

SHORT WAVELENGTH FIBER LASER

CROSS REFERENCE TO RELATED APPLICATIONS

This application takes priority from U.S. Provisional patent application Serial No. 60/114,710, filed Jan. 4, 1999.

FIELD OF THE INVENTION

This invention is related, generally, to the field of fiber optic lasers and, more specifically, to fiber optic lasers that operate in a shorter than normal wavelength range.

BACKGROUND OF THE INVENTION

Fiber optic lasers are known in the art, and are used as coherent optical sources for a number of applications. An optical fiber, often doped with an active material such as a rare earth element, is "pumped" by coupling optical energy into it at a predetermined wavelength. The pumping wavelength is selected according to the characteristics of the fiber, such as an absorption band of a particular dopant that has been used. Pumping energy coupled into the fiber is absorbed, causing a population inversion in the doped material that is followed by optical radiation at a characteristic wavelength of the doped fiber. By providing the fiber with reflective ends, a resonance condition develops within the fiber cavity. An output coupler, being only partially reflective, allows the output of the developed laser energy.

Many fiber optic lasers use a single mode fiber, and couple the pumping energy of the laser directly into the fiber core. Alternatively, the fiber may be a double-clad fiber in which the core is surrounded by two different cladding layers, an inner or "pump" cladding surrounding the core, and an outer cladding surrounding the pump cladding. Fibers of this configuration may be pumped by injecting the pump energy into the pump cladding layer of the fiber. The pump energy repeatedly encounters the core of the fiber as it undergoes internal reflection within the pump cladding layer, and is absorbed by the dopant of the core, providing the desired population inversion. The use of a double-clad fiber typically allows the coupling of a greater amount of pump energy into the laser than is possible with a single-cladding fiber. As such, double-clad fiber lasers are desirable for higher power laser applications.

One example of a cladding-pumped fiber laser uses a double clad fiber doped with ytterbium (Yb). Like other rare earth doped optical fibers, the Yb doped fiber laser has a "gain bandwidth" of optical wavelengths that are generated by the doped fiber when it is pumped. Often it is desirable to operate the laser at a narrow band of output wavelengths, and the laser may therefore be stabilized to resonate over such a wavelength range. Typically, such stabilizing is accomplished using a wavelength selective element, such as a fiber grating, in the laser cavity. The result is a high power narrow bandwidth laser.

Certain applications exist for which it is desirable to provide laser energy at a wavelength toward the shorter end of a given fiber laser gain spectrum. For example, it is desirable in some instances to operate a Yb-doped cladding-pumped fiber laser at a wavelength between 1060 nm and 1090 nm. Typically, such a laser is stabilized to the desired output wavelength by a high-reflectivity input grating.

SUMMARY OF THE INVENTION

The present invention provides a fiber laser that, for a given temperature range, is more stable than those of the prior art. It has been discovered that, as the temperature of the fiber laser increases (due, for example, to a rise in ambient temperature, or additional heating resulting from an increase in pumping power), the laser becomes unstable. In the case of a Yb-doped laser stabilized at 1080 nm, the instability manifests itself as an additional wavelength peak at about 1095 nm. Of course, this significantly reduces the usefulness of the laser for its intended application.

In accordance with the present invention, a fiber laser is therefore provided with a gain spectrum control mechanism that maintains wavelength stability in the apparatus by preventing a thermally-induced shift of the gain spectrum to a wavelength range that is unstable for the desired fiber laser wavelength (also referred to herein as the "signal wavelength"). That is, the laser is operated so that the gain spectrum for which the instability problem arises is not encountered. The two general ways of providing this control are by shifting a nominal gain spectrum of the laser away from the less stable wavelength range, and by preventing a shift of the gain spectrum by controlling the operating temperature of the laser. The laser may use any of a number of different types of optical fibers, but in the preferred embodiment it is a multiple clad fiber and, more particularly, a double clad fiber.

When the nominal gain spectrum of the laser is shifted sufficiently away from the less stable wavelength range, the gain spectrum can drift with temperature without encountering the less stable range. For example, the reflectivity of the resonant cavity may be reduced below the typical level. As such the laser must operate at a higher gain, resulting in a shift of the gain spectrum toward the shorter wavelengths (i.e., away from the less stable wavelength range). In one embodiment, the reflectivity is reduced by angling the reflector at the end of the resonant cavity of the laser away from a high reflectivity position. Typically, an angle of about one to five degrees relative to a surface perpendicular to a longitudinal axis of the fiber is sufficient. If the output end of the fiber core defines the reflective end of the cavity, the fiber may be cleaved or polished such that the core is at the desired angle. In a different version of this approach, a coating may be applied to the end of the fiber that reduces the reflectivity of the polished or cleaved fiber end to optical energy at the signal wavelength, and thereby reduces signal reflectivity below the glass-to-air Fresnel reflection level.

Another way that the invention may shift the nominal gain spectrum of the laser away from the undesired wavelength range is by increasing the population inversion of the doped core. One approach to doing this is to increase the absorption of pump energy. In one embodiment, a pump energy reflector is provided at the output end of the fiber. The pump reflector reflects pump energy from the inner cladding back through the inner cladding in the opposite direction, thus allowing the absorption of pump energy that was not initially absorbed by the doped core. The pump energy reflector may be a mirror affixed to the end of the fiber that is reflective at the wavelength of the pump energy. Preferably, it does not provide a strong reflection of signal energy from the core. The mirror may therefore be annular, such that it does not intersect the core. A separate low-level reflector for light in the signal wavelength band could be used in this embodiment to provide the desired stabilization of signal energy in the core. In an alternative to the annular mirror, the reflective material may cover the entire end of the fiber, but have a relatively low reflectance at the wavelength of the signal energy. For this embodiment, a coating material may be used that is applied to the end of the fiber.

Other parameters of the apparatus may also be configured to increase the population inversion of the laser. For example, the overall length of the laser fiber may be made short relative to a fiber laser having similar operational parameters. This requires a higher gain and, therefore, a higher population inversion along the fiber to reach laser threshold. The population inversion in the core may also be increased by decreasing the diameter of the inner cladding.

As mentioned above, the shift of the gain spectrum into the undesired wavelength range may also be accomplished by minimizing the shifting of the gain spectrum due to temperature. In an alternative embodiment of the invention, the fiber laser, or at least a portion of it, is maintained in a thermally controlled environment. A temperature-controlled housing may be used that prevents any significant change in the operating temperature of the laser, and therefore prevents any significant shift in the gain spectrum. In the preferred embodiment, the gain spectrum shifts toward the undesired region when the fiber temperature increases. A housing having a cooling mechanism may therefore be used, such as one with an air cooling or water cooling mechanism attached.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENTS

Figure 1:
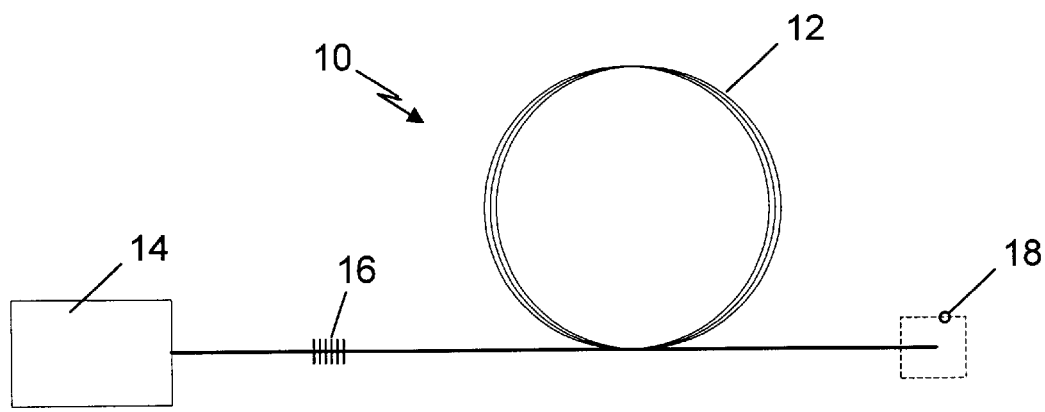
FIG. 1 is a schematic view of a fiber laser according to the present invention.

Shown in FIG. 1 is a schematic view of a fiber laser 10 according to the present invention. In this embodiment, the fiber laser is cladding-pumped, and therefore uses a coil 12 of double-clad fiber, as is known in the art. The fiber, and in particular the core of the fiber, is doped with ytterbium (Yb) ions. The ytterbium acts as the active element of the laser, undergoing a population inversion as it absorbs optical pumping energy, and generates optical signal energy in a predetermined gain band. The inner cladding, or "pump cladding," of the fiber is pumped by coupling optical energy into it from optical source 14. In this embodiment, the source is a laser diode having a center output wavelength of approximately 915 nm.

The useful gain band of the laser of FIG. 1 is a wavelength range of approximately 1010 nm to 1160 nm. However, the laser is stabilized by a periodic grating 16 that is preferably written into the fiber in a known manner. The grating is tuned to a wavelength of 1080 nm. In order to generate a desired output of fifteen Watts at the 1080 nm wavelength, the pumping source 14 couples approximately twenty-five Watts into the inner cladding of the fiber at a pump wavelength of approximately 915 nm.

Difficulty can arise if the fiber laser temperature increases. In the past, such temperature increases have been found to destabilize the laser. In particular, it has been found that an additional output peak begins to appear at about 1095 nm. The fiber lasers described below each address this instability problem.

Figure 2:
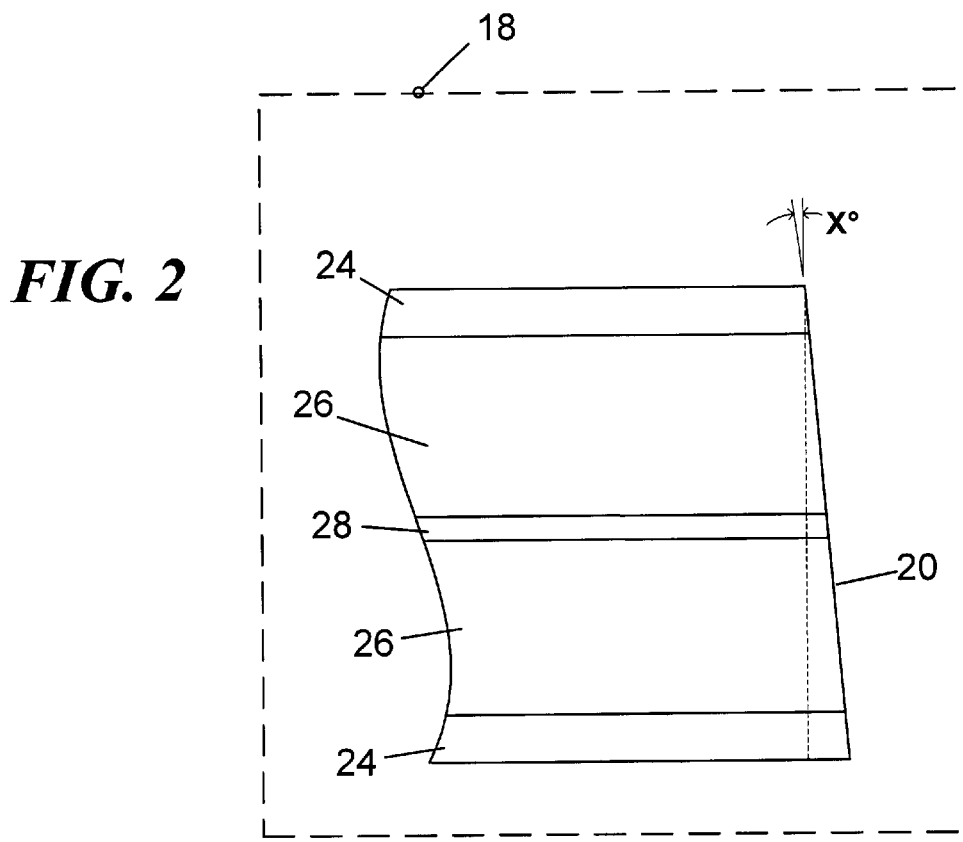
FIG. 2 is an isolated view of the end of a fiber that may be used in a configuration such as that shown in FIG. 1, and in which the fiber end is cleaved or polished at a predetermined angle.

An output portion 18 of the fiber laser is identified by a broken line in FIG. 1. In FIG. 2, a first embodiment of the invention is shown in which this output portion of the laser is constructed to improve the stability of the laser. In this case, the reflectivity of the laser output is reduced slightly by angling the output reflector (in this case the polished or cleaved end of the fiber) at a small pitch relative to a surface perpendicular to the longitudinal axis of the fiber. FIG. 2 is a cross-sectional side view of the end of the fiber. The dimension lines labeling the relative angle "X" between fiber surface 20 and a surface perpendicular to the fiber axis (identified by the dotted line) indicate the pitch at the end of the fiber. Preferably, the angle X will be one to five degrees. This slight angle of the output reflector results in an overall lower reflectivity in the laser cavity. As a result, a higher gain must be generated within the laser before an output is generated. The laser therefore has a higher population inversion and the gain spectrum is shifted toward the shorter wavelengths.

Figure 3:
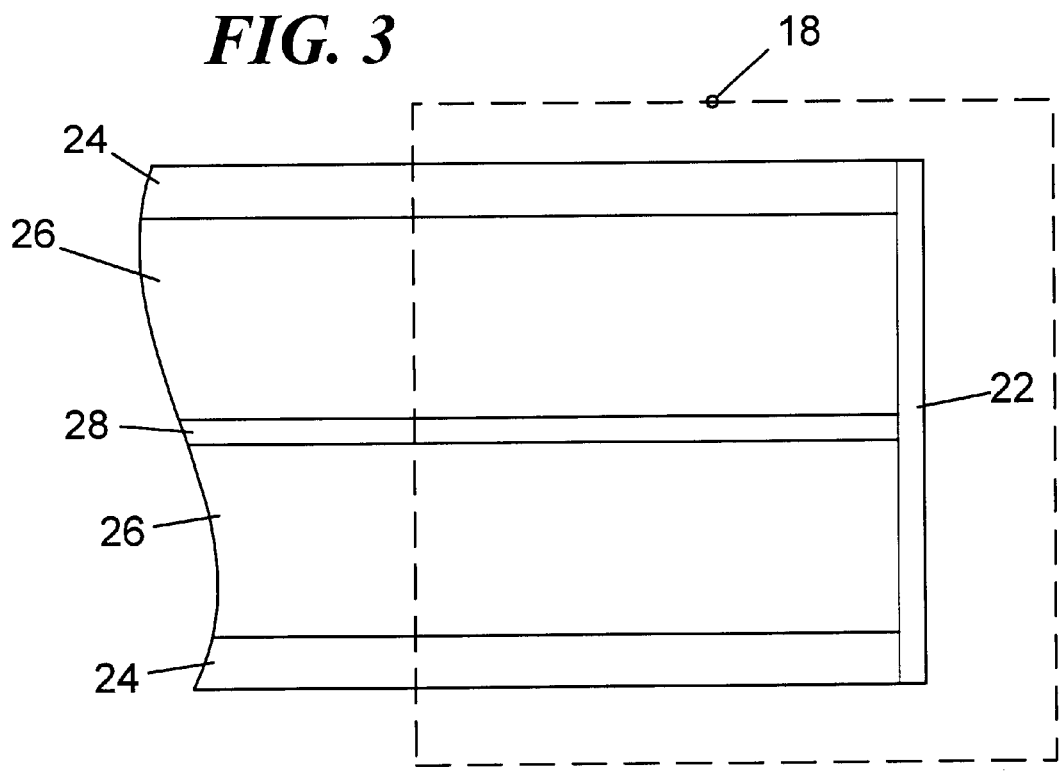
FIG. 3 is an isolated view of the end of a fiber that may be used in a configuration such as that shown in FIG. 1, and in which a coating is used to reduce the reflectivity of the laser.

FIG. 3 also depicts the output end 18 of the fiber laser in cross section. In this embodiment of the invention, the output reflectivity of the laser is reduced, as it is in the embodiment of FIG. 2. In the FIG. 3 embodiment, however, the laser reflector, i.e., the fiber end, is not angled relative to a surface perpendicular to the fiber axis. Instead, an optical coating 22 is used on the end of the fiber to reduce the reflectivity of the fiber end. Those skilled in the art will recognize that the "coating" may actually consist of more than one coating if necessary to obtain the desired reduction in signal reflectivity. The coating 22 reduces the reflectivity of the fiber end by allowing more light at the desired lasing wavelength to pass out of the cavity.

Examples of coating materials that may be used for the embodiment of FIG. 3 include $HfO_2$, $TiO_2$, $SiO_2$ and $Ta_2O_5$. The percentage reduction in reflectivity necessary depends on the specific characteristics of the fiber laser. However, as an example, the laser described above, having an output wavelength of 1080 nm at a power of fifteen Watts, and being cladding pumped with twenty-five Watts of light from the source 14 at a pump wavelength of 915 nm, will generally be stable over an ambient temperature range of fifteen to forty-five degrees Celsius when the signal reflectivity is reduced to approximately one percent. Naturally, given the same laser parameters, the same reduction in reflectivity applies to the embodiment of FIG. 2.

If the gain spectrum of the laser is shifted by reducing its reflectivity, such as in the embodiments of FIG. 2 and FIG. 3, those skilled in the art will recognize that it is only necessary to affect the output surface of the fiber in the vicinity of the fiber core 28. That is, the double-clad fiber shown in these figures has a core 28, a pump cladding 26 and an outer cladding 24. During laser operation, the laser cavity is essentially defined only by the core 28. Therefore, only the core 28 reflectivity must be reduced, and the surfaces of the fiber in the vicinity of the inner cladding 26 and outer cladding 24 need not have such a careful treatment for reflectivity. As such, the surface angling of FIG. 2, or the coating treatment of FIG. 3, could be applied only to the core region of the end of the fiber. To avoid excessive complication, however, the entire fiber end is preferably treated as a whole in each of those embodiments.

Figure 4:
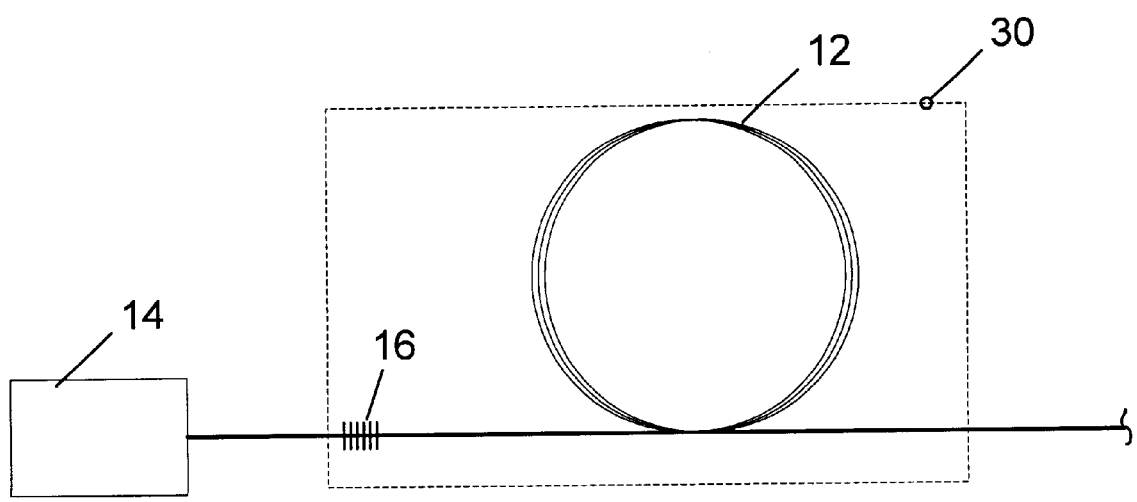
FIG. 4 is a schematic view of a fiber laser according to the present invention in which the laser is maintained in a thermally controlled environment.

In FIG. 4, a different approach is used to prevent destabilization of the laser. Rather than controlling the reflectivity of the laser cavity, the laser is maintained at an ambient temperature low enough to prevent the shift of the gain spectrum due to heat. The components of the FIG. 4 embodiment are the same as those in FIG. 1, except that a standard output coupling is used. In addition, the laser is kept within a cooled environment, typically a cooled housing 30. The housing 30 is represented in FIG. 4 by a dashed line surrounding the laser, and is not shown with any structural specifics. However, given the description herein, construction of a housing is well within the ability of those skilled in the art. In particular, air cooling or water cooling mechanisms may be used.

Figure 5:
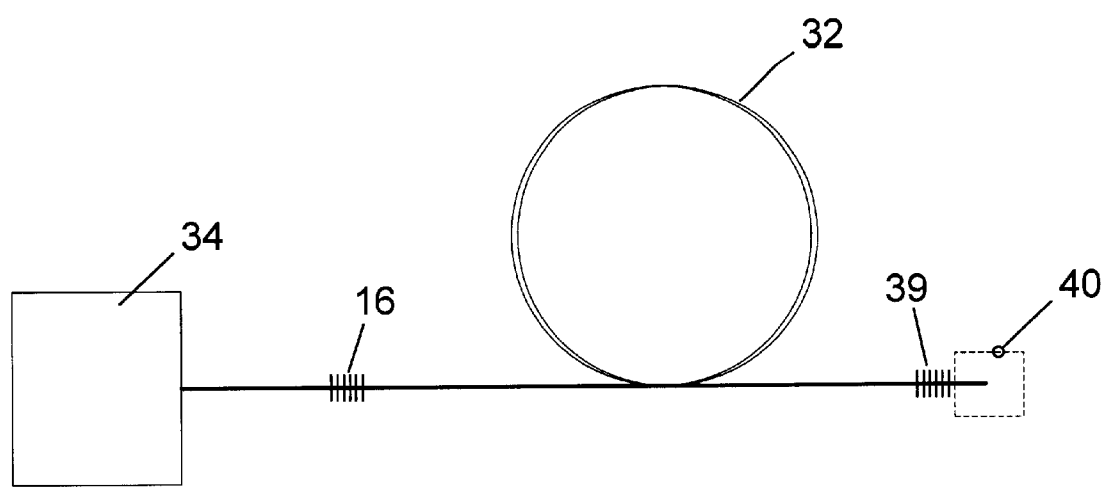
FIG. 5 is a schematic view of a fiber laser according to the present invention in which a shorter doped fiber is used.

Like the embodiments of FIGS. 2 and 3, the embodiment of FIG. 5 accomplishes the desired gain spectrum shift by increasing the population inversion of the laser. However, rather than reducing the reflectivity in the laser cavity, the cavity is shortened in length. The fiber coil 32 is intentionally shorter than that which would be typically used. This reduced length results in a higher inversion per unit length of the fiber so that higher gain is achieved with a shift of the gain spectrum toward the shorter wavelengths. However, the fiber must still be long enough to absorb a sufficient amount of pump energy from pump source 34. The component for producing high reflectivity at the pump wavelength is represented by broken line element 40, the embodiments of which are discussed in more detail below. The grating 39 is a reflector that reflects in the wavelength range of the signal wavelength, and that has a relatively low level of reflectivity. Notably, this low-level signal reflector would not be necessary if the element 40 provided low-level reflectivity at the signal wavelength to help stabilize the signal energy in the fiber core.

Figure 6:
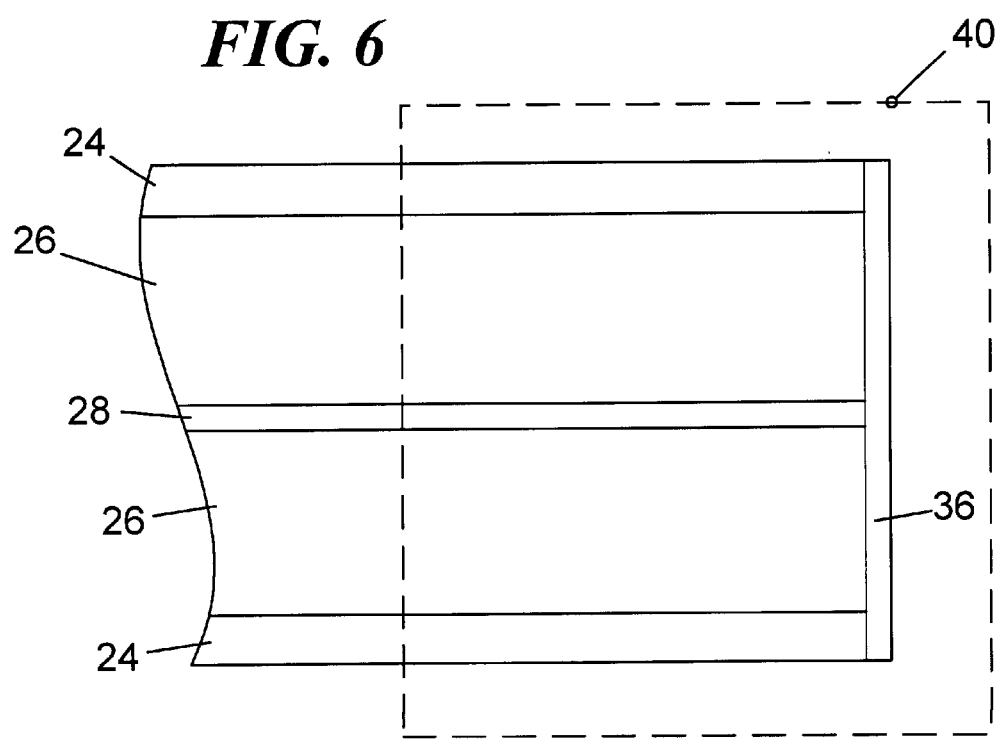
FIG. 6 is an isolated view of the end of a fiber that may be used in a configuration such as that shown in FIG. 5, and in which a coating is used to increase the reflectivity of the pump energy.

Different laser parameters may be modified to increase the population inversion and maintain wavelength stability at a higher temperature. For example, the laser may be constructed with an inner cladding layer of smaller diameter and pumped with a higher brightness pump laser. This allows the pump light coupled into the cladding to be absorbed over a shorter length. Using pumping energy having a wavelength near 975 nm also allows the use of a shorter fiber with a higher inversion In one version of the invention that uses a shorter laser fiber, a pump reflector is located at the output end 40 of the laser fiber and reflects the pump energy back through the fiber. This reflector may be attached directly to the end of the fiber. The reflector may also be applied so as to affect only the inner cladding of the fiber. A first embodiment of this type is shown in FIG. 6. On the end of the laser fiber, a reflective coating 36 is applied so that it covers the entire pump cladding area. The coating may be applied across substantially the entire end surface of the fiber, as shown in the figure, provided that it is not significantly reflective at the signal wavelength. This simplifies the application process. Examples of materials useful for coating 36 include $HfO_2$, $TiO_2$, $SiO_2$ and $Ta_2O_5$, although those skilled in the art will recognize other materials that have equivalent properties. The reflection of the pump energy from the end of the fiber back into the pump cladding 26 increases the population inversion of the fiber laser, and results in the desired shift of the gain spectrum of the laser. Notably, coating 36 of FIG. 6 could also be a mirror affixed to the end of the fiber that has low reflectivity at the signal wavelength. This would have the same functional effect as use of a coating material.

Figure 7:
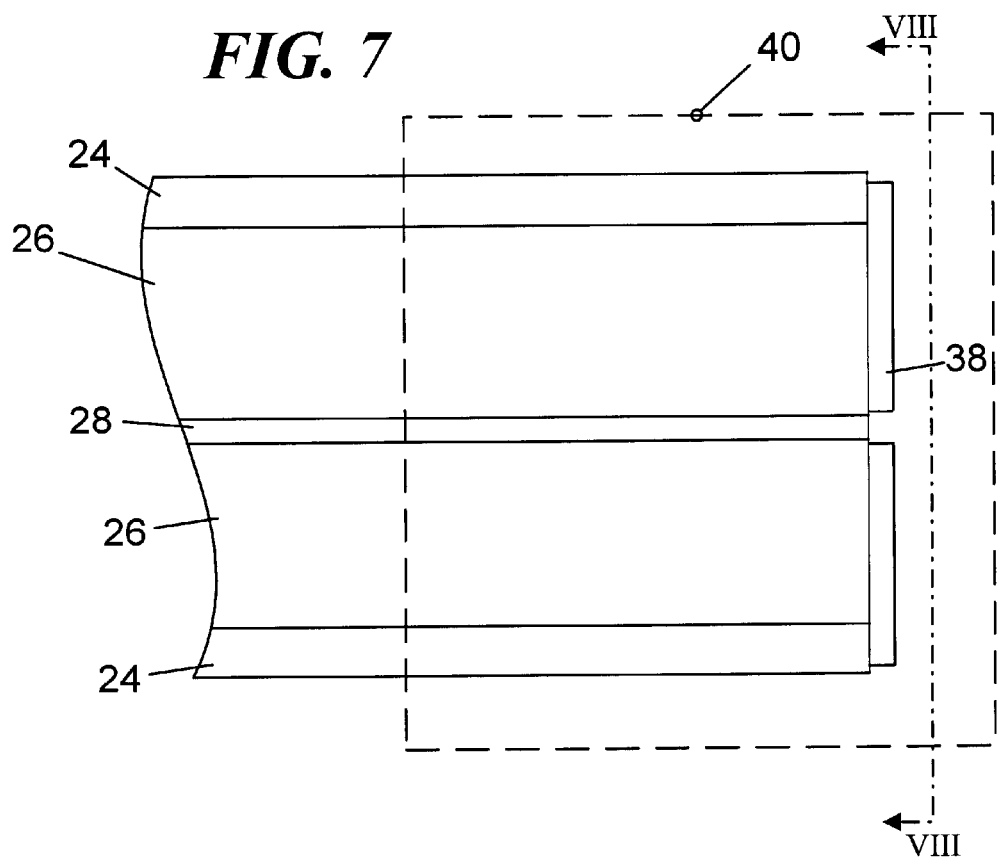
FIG. 7 is an isolated view of the end of a fiber that may be used in a configuration such as that shown in FIG. 1, and in which a reflective surface is affixed to the end of the fiber adjacent the pump cladding.
Figure 8:
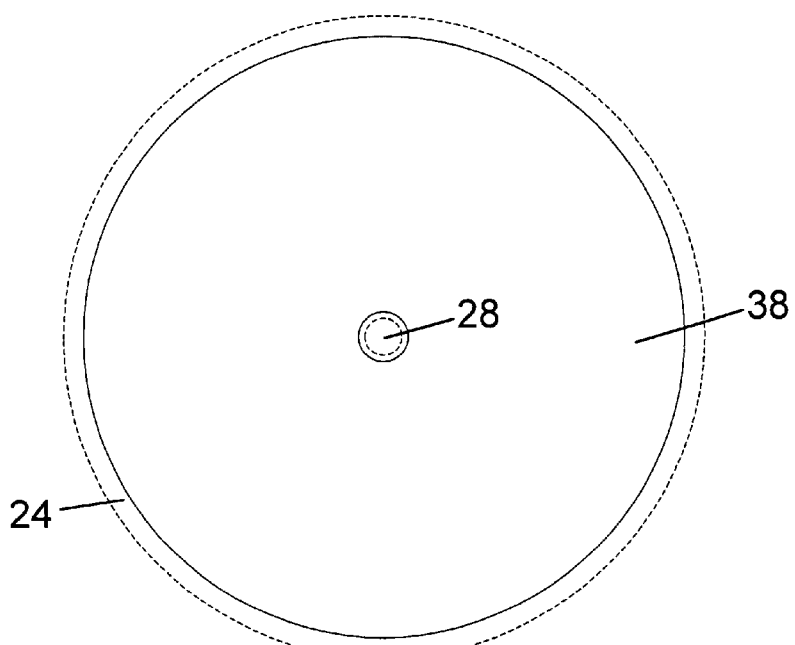
FIG. 8 is an end view of the fiber of FIG. 7 showing the relative location of the reflective surface.

In an alternative embodiment, the pump energy is reflected at the end of the fiber using an annular reflective surface affixed to the fiber end. In the cross section of FIG. 7, a mirror 38 is shown attached to the end of the fiber. To avoid reflection of the signal wavelength, the mirror is annular in shape, and covers most or all of the exposed surface of the pump cladding 26. An end view of the fiber end with the mirror 38 attached is shown in FIG. 8. For reference purposes, dotted lines are used to show a typical location of the outer radius of the fiber, and the boundary between the core and the pump cladding. As shown, the mirror does not overlap the core, and therefore does not affect the reflectivity at the end of the fiber core. To maintain the positional stability of the mirror, it is preferably cemented directly to the end surface of the fiber.

While the invention has been shown and described with reference to a preferred embodiment thereof, it will be recognized by those skilled in the art that various changes in form and detail may be made herein without departing from the spirit and scope of the invention as defined by the appended claims.

What is claimed is:

1. A fiber laser apparatus comprising:
   an optical fiber having a core that is doped with an active element that generates optical energy at a signal wavelength when pumped by optical energy at a pump wavelength;
   a pump source that couples optical energy at said pump wavelength into the fiber; and
   a gain spectrum control mechanism that maintains wavelength stability in the apparatus by preventing a thermally-induced shift of a gain spectrum of the apparatus to a wavelength range that provides less stability at the signal wavelength.

2. Apparatus according to claim 1 wherein the control mechanism shifts a nominal wavelength range of the gain spectrum away from the less stable wavelength range.

3. Apparatus according to claim 2 wherein the control mechanism comprises a reflectivity adjuster that reduces the reflectivity of a resonant cavity of the apparatus.

4. Apparatus according to claim 3 wherein the reflectivity adjuster comprises an angled reflector at the end of the resonant cavity that directs some of the optical energy within the cavity away from an interior of the cavity.

5. Apparatus according to claim 4 wherein the angled reflector has a reflective surface that is at an angle of from one to five degrees relative to a surface perpendicular to a longitudinal axis of the cavity.

6. Apparatus according to claim 4 wherein the angled reflector comprises a surface of the fiber core.

7. Apparatus according to claim 3 wherein the reflectivity adjuster comprises a coating at one end of the resonant cavity that reduces the reflectivity at the end of the fiber to optical energy at the signal wavelength.

8. Apparatus according to claim 7 wherein the coating comprises at least one of $HfO_2$, $TiO_2$, $SiO_2$ and $Ta_2O_5$.

9. Apparatus according to claim 2 wherein the control mechanism comprises a population inversion enhancer that increases the population inversion of the doped core.

10. Apparatus according to claim 9 wherein the inversion enhancer comprises a pump energy reflector that reflects pump energy into the fiber.

11. Apparatus according to claim 10 wherein the fiber is a multiple clad fiber having an inner cladding within which pump energy propagates, and wherein the pump energy reflector is adjacent to a surface of the inner cladding.

12. Apparatus according to claim 11 wherein the pump reflector is not substantially adjacent to a surface of the core.

13. Apparatus according to claim 10 wherein the pump energy reflector comprises a reflective coating applied to an end of the fiber.

14. Apparatus according to claim 13 wherein the reflective coating comprises at least one of $HfO_2$, $TiO_2$, $SiO_2$ and $Ta_2O_5$.

15. Apparatus according to claim 10 wherein a length of the fiber is short relative to a fiber having similar operational parameters but no pump energy reflector.

16. Apparatus according to claim 10 wherein the fiber is a multiple clad fiber having an inner cladding within which the pump energy propagates, and wherein a diameter of the inner cladding is small relative to a fiber having similar operational parameters but no pump energy reflector.

17. Apparatus according to claim 1 wherein the control mechanism comprises a controlled temperature environment in which at least a portion of the apparatus resides.

18. Apparatus according to claim 17 wherein the controlled temperature environment maintains the temperature of said apparatus portion below a predetermined temperature.

19. Apparatus according to claim 1 further comprising a stabilizing grating within a resonant cavity of the apparatus that promotes a narrow bandwidth wavelength resonance condition within the cavity.

20. Apparatus according to claim 1 wherein the control mechanism prevents the gain spectrum of the apparatus from shifting to a wavelength range having optical energy with an average wavelength higher than the signal wavelength.

21. Apparatus according to claim 1 wherein the active element comprises ytterbium.

22. Apparatus according to claim 1 wherein the signal wavelength is approximately 1080 nm.

23. Apparatus according to claim 1 wherein the fiber is a multiple clad fiber.

24. Apparatus according to claim 1 wherein the fiber is a double clad fiber.

25. A fiber laser apparatus comprising:
an optical fiber having a core that is doped with an active element that generates optical energy at a signal wavelength when pumped by optical energy at a pump wavelength;
a pump source that couples optical energy at said pump wavelength into the fiber;
a stabilizing grating within a resonant cavity of the apparatus that promotes a narrow bandwidth wavelength resonance condition within the cavity; and
a reflectivity adjuster that provides the resonant cavity with a reduced reflectivity so as to prevent a thermally-induced shift of a gain spectrum of the apparatus to a wavelength range that provides less stability at the signal wavelength.

26. Apparatus according to claim 25 wherein the reflectivity adjuster comprises an angled reflector at the end of the laser cavity that directs some of the optical energy within the cavity away from an interior of the cavity.

27. Apparatus according to claim 26 wherein the angled reflector has a reflective surface that is at an angle of from one to five degrees relative to a surface perpendicular to a longitudinal axis of the cavity.

28. Apparatus according to claim 26 wherein the angled reflector comprises a surface of the fiber core.

29. Apparatus according to claim 25 wherein the reflectivity adjuster comprises a reflective coating applied to an end of the fiber that reduces the reflectivity at the end of the fiber to optical energy at the signal wavelength.

30. Apparatus according to claim 25 wherein the fiber is a multiple clad fiber.

31. Apparatus according to claim 25 wherein the fiber is a double clad fiber.

32. A fiber laser apparatus comprising:
an optical fiber having a core that is doped with an active element that generates optical energy at a signal wavelength when pumped by optical energy at a pump wavelength;
a pump source that couples optical energy at said pump wavelength into the fiber;
a stabilizing grating within a resonant cavity of the apparatus that promotes a narrow bandwidth wavelength resonance condition within the cavity; and
a population inversion enhancer that increases the population inversion of the doped core so as to prevent a thermally-induced shift of a gain spectrum of the apparatus to a wavelength range that provides less stability at the signal wavelength.

33. Apparatus according to claim 32 wherein the inversion enhancer comprises a pump energy reflector that reflects pump energy from the inner cladding into an interior of the inner cladding.

34. Apparatus according to claim 33 wherein the pump energy reflector comprises a mirror adjacent to a surface of the inner cladding.

35. Apparatus according to claim 34 wherein the mirror is not substantially adjacent to a surface of the core.

36. Apparatus according to claim 33 wherein the pump energy reflector comprises a reflective coating applied to an end of the fiber.

37. Apparatus according to claim 32 wherein the fiber is a multiple clad fiber.

38. Apparatus according to claim 32 wherein the fiber is a double clad fiber.

39. A method of maintaining wavelength stability in a fiber laser apparatus having an optical fiber with a core and a pump source that couples optical energy at a pump wavelength into the fiber, the core being doped with an active element that generates optical energy at a signal wavelength when pumped by optical energy at the pump wavelength, the method comprising preventing a thermally-induced shift of a gain spectrum of the apparatus to a wavelength range that provides less stability at the signal wavelength.

40. A method according to claim 39 wherein preventing a thermally-induced shift of the apparatus gain spectrum comprises establishing a nominal wavelength range of the gain spectrum away from the less stable wavelength range.

41. A method according to claim 40 wherein the preventing of a thermally-induced shift of the apparatus gain spectrum comprises lowering the reflectivity of a resonant cavity of the apparatus.

42. A method according to claim 41 wherein adjusting the reflectivity of the resonant cavity comprises providing an angled reflector at the end of the resonant cavity that directs some of the optical energy within the cavity away from an interior of the cavity.

43. A method according to claim 42 wherein the angled reflector has a reflective surface that is at an angle of from one to five degrees relative to a surface perpendicular to a longitudinal axis of the cavity.

44. A method according to claim 41 wherein adjusting the reflectivity of the resonant cavity comprises angling a reflective surface of the fiber core.

45. A method according to claim 41 wherein adjusting the reflectivity of the resonant cavity comprises coating an end surface of the fiber core with a coating material that reduces the reflectivity of the surface at the signal wavelength.

46. A method according to claim 45 wherein the coating comprises at least one of $HfO_2$, $TiO_2$, $SiO_2$ and $Ta_2O_5$.

47. A method according to claim 39 wherein preventing a thermally-induced shift of the apparatus gain spectrum comprises increasing a population inversion of the doped core.

48. A method according to claim 47 wherein the fiber is a multiple clad fiber with an inner cladding surrounding the core and wherein increasing a population inversion of the doped core comprises reflecting pump energy from the inner cladding into an interior of the inner cladding.

49. A method according to claim 48 wherein reflecting pump energy from the inner cladding comprises locating a mirror adjacent to a surface of the inner cladding.

50. A method according to claim 49 wherein the mirror is not substantially adjacent to a surface of the core.

51. A method according to claim 48 wherein reflecting pump energy from the inner cladding comprises applying a reflective coating to an end of the fiber.

52. A method according to claim 51 wherein the reflective coating comprises at least one of $HfO_2$, $TiO_2$, $SiO_2$ and $Ta_2O_5$.

53. A method according to claim 39 wherein preventing a thermally-induced shift of the apparatus gain spectrum comprises maintaining a controlled temperature environment in which at least a portion of the apparatus resides.

54. A method according to claim 39 further comprising providing a stabilizing grating within a resonant cavity of the apparatus that promotes a narrow bandwidth wavelength resonance condition within the cavity.

55. A method according to claim 39 wherein the active element comprises ytterbium.

56. A method according to claim 39 wherein the signal wavelength is approximately 1080 nm.

57. A method according to claim 39 wherein the fiber is a multiple clad fiber.

58. A method according to claim 39 wherein the fiber is a double clad fiber.

* * * * *